United States Patent [19]

Nowosiadly

[11] Patent Number: 5,846,631
[45] Date of Patent: Dec. 8, 1998

[54] MOLDING

[75] Inventor: Donald C. Nowosiadly, Oakland Township, Mich.

[73] Assignee: Nicholas Plastics, Inc., Allendale, Mich.

[21] Appl. No.: 887,872

[22] Filed: Jul. 3, 1997

Related U.S. Application Data

[63] Continuation of Ser. No. 651,112, May 21, 1996, abandoned, which is a continuation of Ser. No. 346,685, Nov. 30, 1994, Pat. No. 5,561,003.

[51] Int. Cl.⁶ ..................................................... E06B 7/16
[52] U.S. Cl. ........................... 428/99; 428/122; 49/490.1; 52/716.6; 52/716.7; 52/717.03
[58] Field of Search ................................ 428/31, 99, 122, 428/358; 49/490.1, 483.1, 484.1, 495.1; 24/292, 297; 296/93; 52/716.6, 716.7, 716.8, 716.5, 717.03

[56] References Cited

U.S. PATENT DOCUMENTS

| | | | |
|---|---|---|---|
| 2,216,219 | 10/1940 | Wiley | 52/716.6 |
| 2,704,687 | 3/1955 | Adell | 24/297 |
| 3,197,935 | 8/1965 | Clancy et al. | 24/297 |
| 3,382,615 | 5/1968 | Adell | 24/297 |
| 3,411,190 | 11/1968 | Augier | 24/297 |
| 3,638,359 | 2/1972 | Kruschwitz | 49/490.1 |
| 4,304,075 | 12/1981 | Miyoshi | 52/98 |
| 4,750,781 | 6/1988 | Betteridge | 296/214 |
| 4,880,674 | 11/1989 | Shimizu | 428/31 |
| 4,969,303 | 11/1990 | Emmons | 52/717.1 |
| 5,018,308 | 5/1991 | Vaughan | 428/122 |
| 5,217,786 | 6/1993 | Keys | 49/490.1 |
| 5,500,264 | 3/1996 | Yada et al. | 428/122 |
| 5,561,003 | 10/1996 | Nowosiadly | 296/93 |

FOREIGN PATENT DOCUMENTS 2748682   5/1978   Germany ................. 49/490.1

Primary Examiner—Alexander Thomas
Attorney, Agent, or Firm—Rader, Fishman, Grauer & MC Garry

[57] ABSTRACT

A molding comprising a U-shaped trim molding in which is defined a channel and from which extends a fastener comprising one or more flexible shanks. Each shank extends from the trim molding and has a lip that extends laterally outwardly and downwardly away from the channel. The shank has multiple serrations in an opposing relationship with the channel. The molding is mounted to a structural support such as a pinch weld or panel with openings of struck-out portions by inserting a portion of the structural support into the channel and seating a lower edge of a return flange of the pinch weld or an edge of the opening or struck-out portion against one of the serrations on the lip of the clip. The resiliency of the trim molding and the shank helps retain the molding to the structural support and accommodates pinch welds of different sizes.

15 Claims, 3 Drawing Sheets

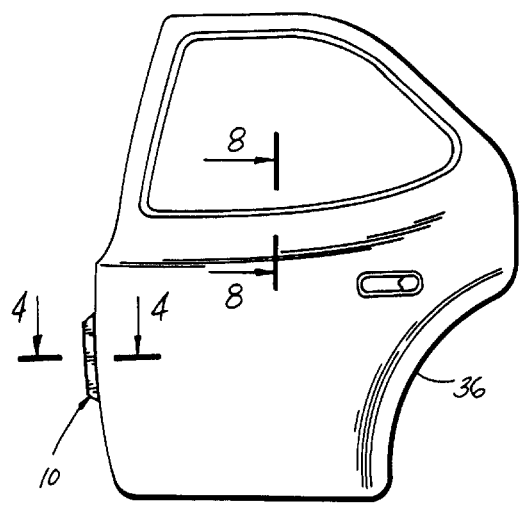
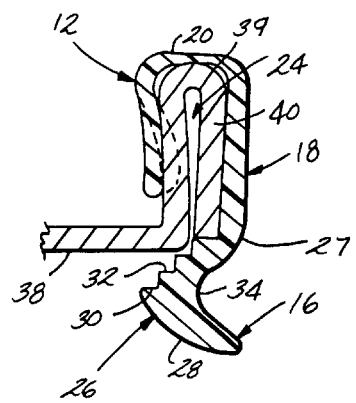
Fig. 3
Fig. 4
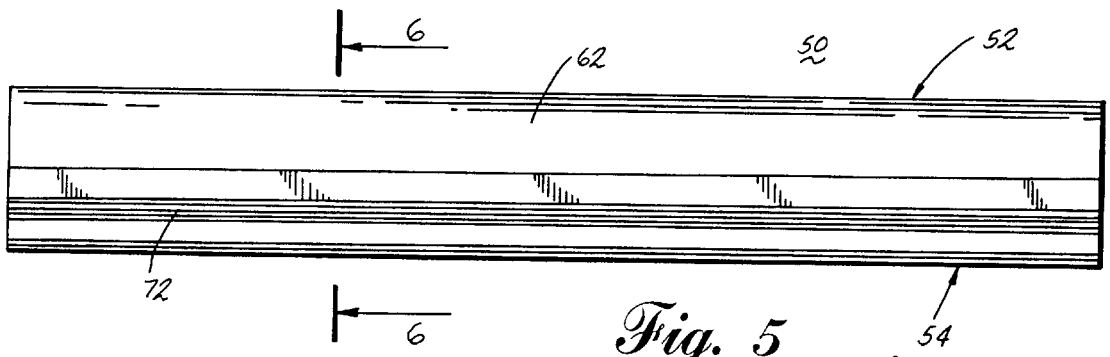
Fig. 5
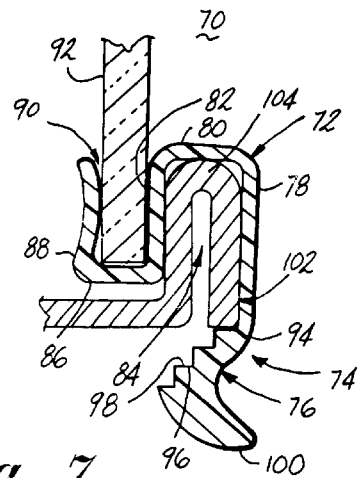
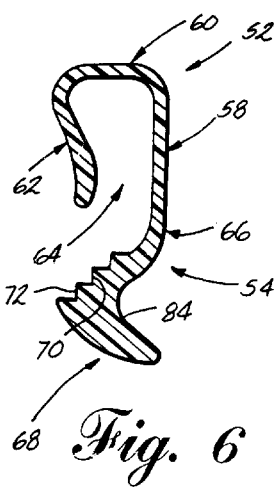
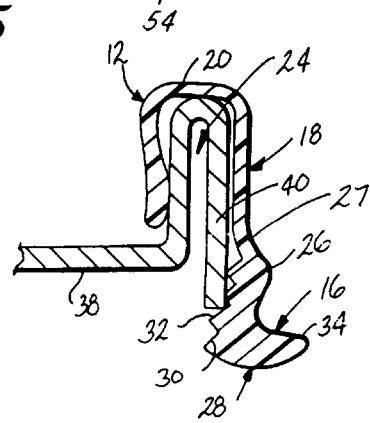
Fig. 7    Fig. 6    Fig. 4A

MOLDING

This application is a continuation of application Ser. No. 08/651,112, filed May 21, 1996, which application is now abandoned, which is a continuation of application Ser. No. 08/346,685, filed Nov. 30, 1994, now U.S. Pat. No. 5,561,003.

BACKGROUND OF THE INVENTION

1. Field of the Invention

The invention relates to moldings, and more specifically to a molding having a fastener for securing the molding to a structural support.

2. Description of the Related Art

Moldings with fasteners have been used to cover aesthetically unpleasing or unfinished portions of a structural support and to connect separate structural supports. For example, moldings have been used on the forward edge of a vehicle rear door to guide the movement of the door in a crash. Typically, the molding is mounted to a structural panel the edge of which is formed by a pinch weld wherein the edge of the panel is formed by folding a portion of the sheet metal over, onto itself. Moldings can also be used to eliminate the gap between two adjacent structural supports, such as the gap between the windshield of a vehicle and the structural frame. Moldings can further be used to mount a door window to a support in vehicles.

For economic reasons, the molding should be simple to manufacture and install while simultaneously performing an aesthetic, connecting or guiding function. It is also desirable that the molding be adaptable for use in a variety of different applications so that specific moldings need not be manufactured for each application. The means to secure the molding to the structural support also needs to be as simple and as easy as possible. The molding should be snug and firm on the support regardless of the variations of the folded flange in the pinch weld support.

It is often difficult for the molding to be snugly and firmly fastened on the structural support because the retaining edge or flange to which the fastener couples can vary in location and size from structural support to structural support. For example, a molding of this type is often used to cover a pinch weld formed at the edge of a structural panel, such as a door. The pinch weld is formed by wrapping the planar panel over its opposite end so that one edge of the panel is enveloped by the other end of the panel and the edge of the overlying or enveloping portion of the panel forms a flange by which the molding is secured to the pinch weld. Unfortunately, the location and size of the flange formed by the edge of the panel can vary from structural panel to structural panel because of the tolerances in the manufacturing process. The variation in the location and size of the flange can result in a loose fitting or insecure molding.

Previous moldings often comprise multiple pieces, such as a clip and a molding. The clip is normally secured to the structural support and is adapted so that the molding can be secured to the clip. Often times, the structural support has accessories such as tabs or apertures that aid in securing the clip to the structural support. Examples of these moldings are found in U.S. Pat. Nos. 3,411,190, issued Nov. 19, 1968; 3,197,935, issued Aug. 3, 1965; and 2,216,219, issued Jun. 5, 1939. Moldings of this type are relatively complex and economically undesirable in that they have multiple pieces that result in a more time consuming and complex assembly. The clips are small and easily lost, which hinders assembly. In some cases, the structural support must be prepared prior to the mounting of the molding, resulting in increased complexity and cost.

Single piece moldings are also known. Examples of single piece moldings can be found in U.S. Pat. Nos. 3,382,615, issued May 14, 1968; 2,704,687, issued Mar. 22, 1955; and 4,750,781, issued Jun. 14, 1988. These moldings are undesirable in that they either are not securely retained to the structural support or the molding does not snugly fit against the structural support.

Therefore, it is desirable to have a simple and easily installable molding that when installed is securely and tightly mounted to the structural support. The molding is preferably complementary in shape with the structural support. Also, it is desirable for the molding to be adaptable to a variety of different applications without requiring an application specific molding.

SUMMARY OF THE INVENTION

A one-piece molding mounts onto a structural support which has a first portion with a planar surface terminating in a top edge and a connecting surface spaced below the top edge. The molding comprises a U-shaped web defining an open channel in which is received the top edge of the structural support. At least one fastener extends from the U-shaped web and retains the molding on the structural support. The fastener comprises a resiliently displaceable support shank which extends downwardly from an end portion of one of the sides of the U-shaped web and a plurality of serrations extending across an inside face of the shank for receiving and retaining the connecting surface when the top edge of the structural support is received in the open channel.

Preferably, the shank extends laterally toward the other of the sides of the U-shaped web to resiliently abut the connecting surface. Also, the shank can extend laterally away from the other of the sides of the U-shaped web at a lower portion of the shank to form a camming lip to guide the structural support into the channel and past the fastener. The camming lip can have a lower rounded surface to aid in the insertion of the structural support. The molding can have one or more fasteners disposed along the length of the U-shaped web. Alternatively, a single fastener can extend along the entire length of the U-shaped web.

In another embodiment of the invention, the U-shaped web further can comprise a substantially L-shaped web extending from a lower portion of the other side of the U-shaped web to define a second open channel for receiving a second structural support. Preferably, the L-shaped web is resilient and a portion of the L-shaped web resiliently abuts the second structural support to retain it within the second open channel. The second structural support can be a sheet of glass.

The molding according to the invention can be mounted to a wide variety of structural supports including pinch welds, sheet metal edges with openings and with struck-out attaching flanges. The molding can be used for a wide variety of purposes including mounting of seals, edge protection for metal edges and as guides for automotive doors.

BRIEF DESCRIPTION OF THE DRAWINGS

The invention will now be described with reference to the drawings wherein:

FIG. 3 illustrates a molding according to the invention attached to the edge of a vehicle door;

FIG. 4 is a sectional view along line 4—4 of FIG. 3;

FIG. 4a illustrates the molding of FIG. 4 attached to a different size pinch weld;

FIG. 5 is a second embodiment of the molding according to the invention;

FIG. 6 is a sectional view along line 6—6 of FIG. 5;

FIG. 7 is a sectional view of a third embodiment of the molding according to the invention;

DESCRIPTION OF THE PREFERRED EMBODIMENTS

Figure 1:
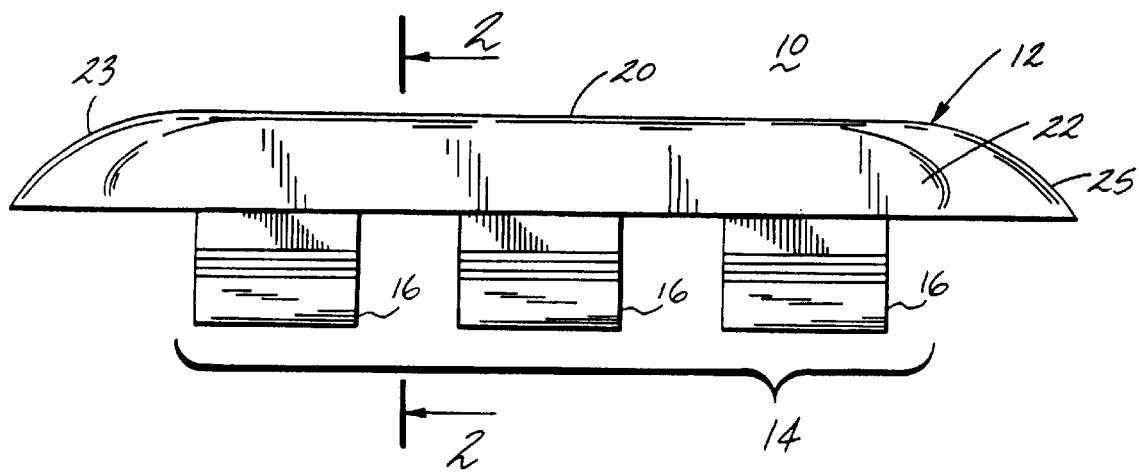
FIG. 1 is a plan view of the molding according to the invention.

FIG. 1 illustrates a molding 10 according to the invention. The molding 10 comprises a U-shaped web 12 from which extends a fastener 14, which preferably comprises multiple clips 16. The fastener 14 can comprise any number of clips 16. It is only necessary that there be a sufficient number of clips to properly secure the molding 10 to a structural support.

Figure 2:
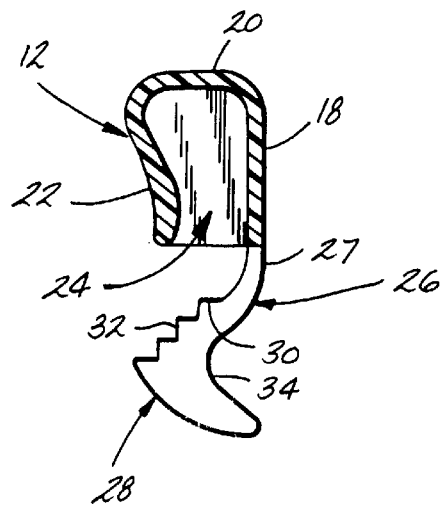
FIG. 2 is a sectional view along line 2—2 of FIG. 1.

Referring to FIGS. 1 and 2, the U-shaped web 12 is preferably formed by a first sidewall 18, top wall 20, second sidewall 22, and end walls 23, 25. The first sidewall 18 and top wall 20 are generally planar whereas the second sidewall 22 is somewhat arcuate in cross section and extends from the end of the top wall 20 inwardly toward the first sidewall 18 where it turns outwardly from the first sidewall 18. The first sidewall 18, top wall 20 and second sidewall 22 define a channel 24 for receiving a portion or all of a structural support. The channel 24 is bounded at its ends by end walls 23 and 25.

As illustrated, the clips 16 of the fastener 14 are substantially identical. However, it is within the scope of the invention for the clips to be of different sizes and/or lengths, depending on the application and the shape of the structural support. Only one of the clips 16 will be described in detail with the understanding that the description applies to all the clips 16. Clip 16 comprises a resilient support shank 26 that extends from the first sidewall 18. The lower portion of the support shank 26 forms an outwardly extending camming lip 28. The lip 28 has an arcuate recess 34 formed at the lower end thereof to reduce the amount of material used in forming the clip 16 and to increase the resiliency of the clip 16.

The shank 26 has a surface 30 that extends inwardly beneath the channel 24 and then downwardly away from the channel 24. Multiple serrations 32 are disposed on the surface 30 in a stair-step-like arrangement. The number of serrations 32 can vary depending on the application. The serrations 32 are illustrated as having a substantially stair-stepped profile and each serration forming approximately the same angle with respect to the surface 30 and having the same size. However, depending on the application, one or more of the serrations 32 can have a different size and can be oriented at different angles with respect to the surface 30 than one or more of the other serrations 32.

The molding 10 is preferably extruded and formed as a single piece from a thermoplastic or thermosetting material that has a suitable degree of resiliency so that the second sidewall 22 and the lip 30 can function like springs to aid in the fastening of the molding 10 on a structural support. A wide variety of synthetic resins are available for this purpose. Suitable synthetic resins include, but are not limited to, polyvinyl chloride, acrylonitrile-butadiene-styrene, acrylic, polypropylene, or nylon, and the like. The end walls 23 and 25 can be formed in a hot forming operation after the extrusion and cutting of the molding to an appropriate length.

Referring to FIGS. 3 and 4, it will be helpful to describe the use of the molding in a typical application, such as applying the molding 10 to a vehicle door 36, which serves as the structural support. The vehicle door 36 is formed with a pinch weld 38 having a return flange 40 at its perimeter. In a pinch weld, the return flange 40 is folded back onto another portion so that the two overlapping portions define the edge 39 or perimeter of the vehicle door 36. The molding 10 is secured to the door 36 by positioning the molding 10 so that the pinch weld 38 is inserted into the channel 24 with the lower edge of the return flange 40 securely seated on one of the serrations.

The molding 10 is adaptable to a wide variety of structural supports in addition to a pinch weld. It can be fastened to any piece of material that has a surface or edge that can be gripped by the serrations 32. For example, any structural support with a return edge can mount the fastener molding as well as a flat structural support with a struck-out portion or with one or more holes. It is within the scope of the invention for the structural support to have a reversely bent portion, one edge of which defines the top edge of the structural support and the other edge of which defines a surface for engaging the serrations. The reversely bent portion extends over and above the structural support.

Depending on the thickness of the pinch weld 38, the second sidewall 22 is sprung outwardly as the pinch weld 38 is inserted into the channel 24. The phantom lines in FIG. 4 illustrate the position of the second sidewall 22 before the second sidewall is sprung. The biasing of the second sidewall 22 helps secure the U-shaped web 12 to the pinch weld 38 and provides for an aesthetic and conforming fit between the pinch weld 38 and the U-shaped web 12. The position of the return flange 40 can vary along the extent of an edge or from door to door. One of the serrations 32 will seat the end of the flange 40 regardless of its location, thus securely mounting the molding 10 to the door or structural support.

The pinch weld 38 is inserted into the channel 24 so that the top wall 20 of the clip 16 is brought into contact with the edge 39 of the pinch weld 38 and the end of the return flange 40 firmly seats on one of the serrations 32. The lip 28 is then flexed by pulling outwardly on the lip 28 so that the end of the upper member of the pinch weld 38 falls within one of the serrations 32. By biasing the shank 26 inwardly, the end of the return flange 40 is secured in abutting relationship with one of the serrations 32 and the shank 26 is sprung so that it will exert a biasing force against the end of the return flange 40 and further aid in securing the molding 10 to the pinch weld 38 of the vehicle door 36.

FIG. 4a illustrates the molding 10 mounted to a pinch weld 39 similar to pinch weld 38, but with flange 40 slightly longer than the flange 40 of FIG. 4. As can be seen in FIG. 4a, when the molding 10 is mounted to pinch weld 39 with the longer flange 40, the end of the flange 40 is seated on one of the serrations 32, resulting in the deflection of the first sidewall 18 and the support shank 26. As shown in FIGS. 4 and 4a, the shank 26 is relatively thick compared to the side walls 18 and 22 so that it remains essentially rigid along its entire length on outward displacement as, for example, by return flange 40. It is the thinner side walls 12 and 18 which resiliently flex to bias the shank 26 inwardly.

Referring to FIGS. 5 and 6, there is illustrated a second embodiment 50 of a molding according to the invention. The second embodiment 50 is substantially similar to the molding 10, except that the fastener comprises a single clip that extends substantially along the entire length of the molding instead of multiple clips spaced along the extent of the molding. Further, the molding is of indefinite length and can be formed by extrusion, for example.

The second embodiment comprises a U-shaped web 52 and a fastener 54 having a single clip 56. The U-shaped web 52 comprises a first sidewall 58, top wall 60, and second sidewall 62, all of which define a channel 64.

The fastener 54 is a single clip 56 comprising a support shank 66 having a camming lip 68. The shank 66 also has a surface 67 on which multiple serrations 69 are disposed. An arcuate recess 65 is formed in the lip 68.

Referring to FIG. 7, there is illustrated a third embodiment 70 of a molding according to the invention. The third embodiment 70 of the molding is substantially similar to the molding 10, except that the U-shaped web comprises a L-shaped flange to form a second channel in which is received a second structural member, such as a sheet of window glass.

The third embodiment 70 comprises an elongated web 72 and a fastener 74 having one or more clips 76. The web 72 comprises a first sidewall 78, top wall 80, and second sidewall 82, all of which define a first channel 84. The web 72 further comprises a L-shaped flange defined by a bottom wall 86 and an outer wall 88. The second sidewall 82, bottom wall 86 and outer wall 88 define a second channel 90 in which is received a structural support, such as a glass panel or window 92.

The clip 76 comprises a shank 94 having a surface 96 on which are disposed a plurality of serrations 98. The shank also has a camming lip 100.

The third embodiment of the molding 70 is mounted to a structural support in a manner similar to that described with respect to the first embodiment. For example, FIG. 7 illustrates the third embodiment of the molding 70 mounted to a pinch weld 102 having an edge 104 and a return flange 106. To mount the molding 70 to the pinch weld 102 of a structural support, the molding 70 is positioned with respect to the pinch weld 102 so that the edge 104 extends into the first channel 84 until the edge 104 abuts the top wall 80 of the molding 70. The serrations 98 of the molding 70 then seat the lower edge of the return flange 106 to securely mount the molding 70 to the pinch weld 102 of a structural support.

The window or glass panel 92 is disposed in the second channel 90. Preferably, the outer wall 88 is resiliently biased against the glass panel 92 to help retain the panel 92 in the second channel 90.

Figure 8:
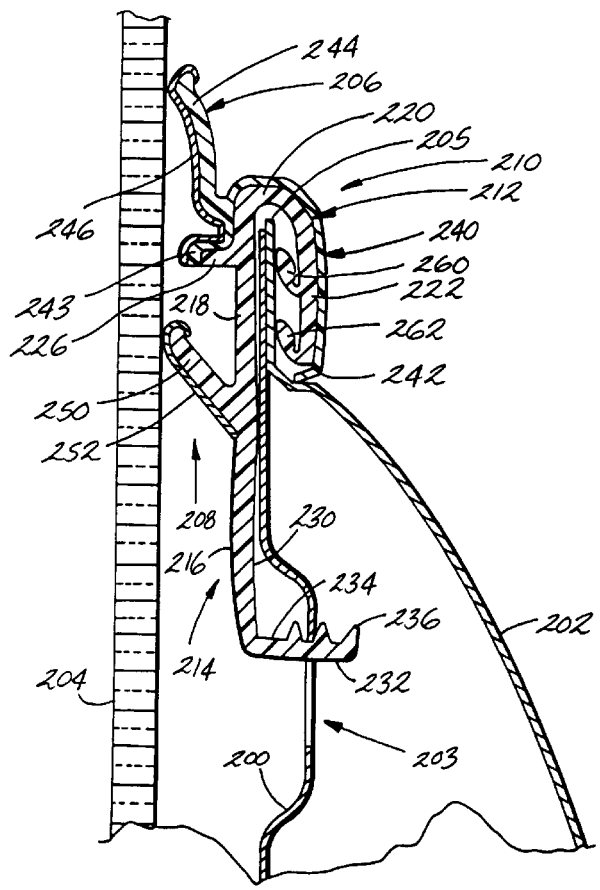
FIG. 8 is a fourth embodiment of the molding according to the invention taken along line 8—8 of FIG. 3.

FIGS. 8 illustrates a fourth embodiment of the molding according to the invention. The fourth embodiment is identified by numerals beginning with 200. A coextruded molding 210 is formed with wipers 206 and 208. The molding is mounted to an interior panel 200 and exterior panel 202 of door 36 in a manner so that a portion of the wipers 206, 208 contact resiliently and wipe against a window 204 of the door. The wipers 206, 208 wipe material from the window 204 as it is raised and lowered The molding 210 comprises a U-shaped web 212 from which extends a fastener 214. Like the previous embodiments, the fastener 214 can have one or more clips 216. The U-shaped web 212 further comprises a first sidewall 218, top wall 220, and second sidewall 222 which define channel 224. A spacer 226 extends outwardly from the first sidewall 218. The clips 216 comprise a support shank 230 connecting a lip 232 to the U-shaped web 212.

The lip 232 has a surface 234 on which extends a plurality of serrations 236. The molding 210 is made from a thermoplastic material.

Unlike the previous embodiments, wipers 206 and 208 extend from the molding 210. The wipers 206, 208 are preferably made from flexible thermoplastic rubber (TPR) and coextruded with the molding 210. Wiper 206 has a thin cover portion 240, which wraps around the top wall 220 and second sidewall 222 of the molding 210. The cover terminates in a depending door seal 242, which seals the U-shaped channel with respect to the exterior door panel 202. A portion of wiper 206 also extends around spacer 226 and forms a bumper 243 to space the window 204 from the molding 210. Wiper 206 also has a blade 244, extending outwardly and upwardly from the first sidewall 218. On its underside, the blade 244 has a layer of flocking 246. The flocking 246 is a soft fibrous layer formed from a mixture of fiber and adhesive, which is electrostatically coated onto the blade 244.

The second wiper 208 comprises a blade 250 extending outwardly from the fastener 214 and also having a layer of flocking 252.

A pair of flange seals 260 and 262 extend from the inner surface of the second sidewall 222. The flange seals 260, 262 are made from TPR and coextruded with the molding 210. When the molding 210 is mounted to the panels 200, 202, the flange seals 260, 262 resiliently abut the panel 202 to seal the channel 224 from the exterior of the vehicle to retard the transfer of sound into the interior of the vehicle through the channel 224.

The molding 210 mounts to the interior panel 200 of the vehicle door 36 and functions as a wiper for a window 204 of the door 36. The interior panel 200, unlike the previous structural supports, does not have a bend or a pinch weld at its upper end to which the molding 210 can be secured. The ends of the interior panel 200 and exterior panel 202 are parallel and are welded together to form an edge 205 without any type of bend or return flange. The interior panel 200 has one or more apertures 203 for mounting the molding 210 to the door panel 200.

To mount the molding 210 to the interior door panel 200, an upper edge 205 of the door panel is inserted into the channel 224 formed by the U-shaped web 212. As the molding 210 is pushed onto the interior door panel 200, the fastener 214 slides along the side of the interior door panel 200 until the lip 232 encounters the aperture 203 in the door panel. The inherent resiliency of the molding 210 urges the lip 232 into the aperture 204 and the serrations 236 engage the edge of the aperture 203 to secure the molding 210 to the interior door panel 200. As the lip 232 is biased inwardly, an audible sound like a "click"e is emitted, indicating that the molding is properly snapped in place.

The blades 244, 250 and flange seals 260, 262 are appropriately sized so that when the molding 210 is snap-fitted to the interior door panel 200, the flocking 246, 252 of the blades 244, 250, is biased against the window 204 and the flange seals 260, 262 contact the interior door panel 200. The blades 244, 250 function as wipers so that when the window is raised and lowered, any moisture or other residue on the window will be wiped away. The flange seals 260, 262 limit the transfer of sound from the exterior of the vehicle into the interior through the U-shaped web 212.

Figure 9:
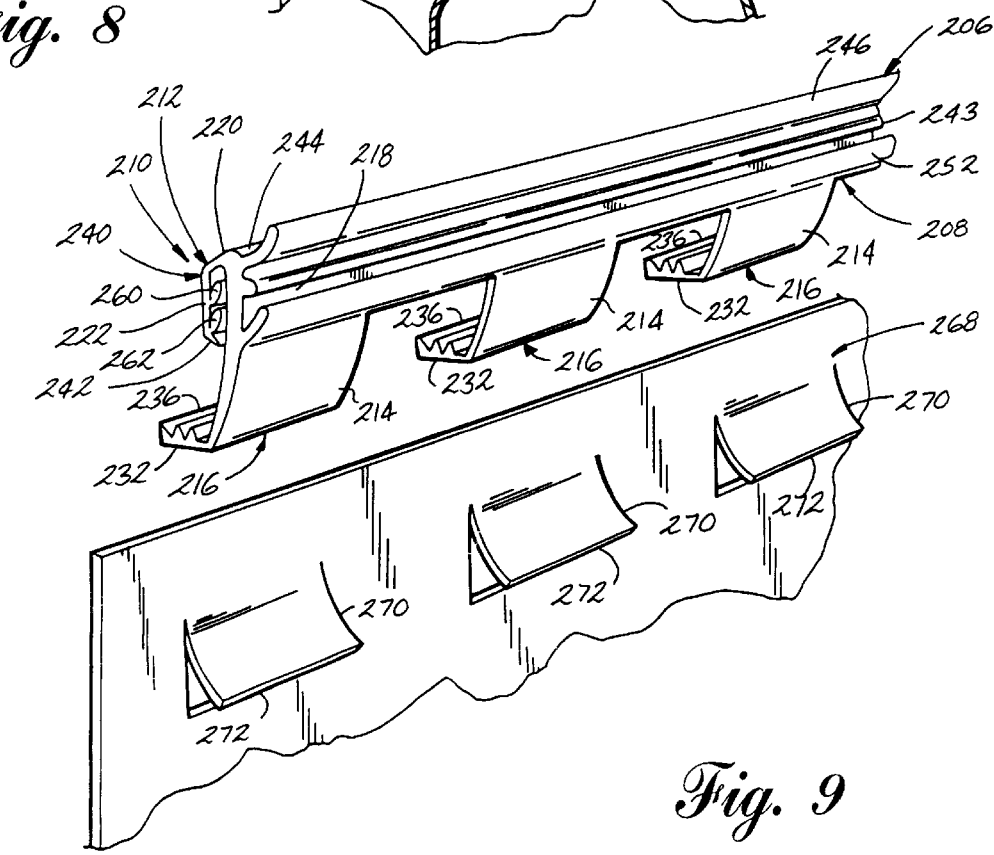
FIG. 9 illustrates the molding of FIG. 8 attached to a panel with struck-out portions.

FIG. 9 illustrates the mounting of the molding 210 to an interior door panel 200 that has struck out portions 270 instead of apertures. The struck out portions 270 have an edge 272 against which the serrations 236 engage to snap-fit the molding to the interior door panel 200.

The invention provides a molding which can be mounted to a variety of structures and/or assemblies, especially pinch welds where the pinched flange can vary. The serrations 32 on the resilient support shank accommodate different widths of such flanges. The invention is simple in that it is of one-piece construction and can be inexpensively manufactured by extrusion of plastic materials. The molding is quickly applied to a structural support and is immediately securely fastened thereto regardless of variations in the size of the attaching flange. The molding can be used on automobile doors, for window supports and a variety of applications in many different fields.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

I claim:

The embodiments of the invention in which an exclusive property or privilege is claimed are defined as follows:

1. The combination of a structural support and a molding comprising:

the structural support having a planar surface terminating in a top edge and having a lower connecting edge spaced below the top edge; and the molding being of one-piece construction and comprising:

a resilient U-shaped web defining an open channel and receiving the top edge of the structural support; and a fastener retaining the molding on the structural support, the fastener comprising:

at least one locking shank, sufficiently rigid in its entirety so that the locking shank flexes as a unit, extending downwardly from an end portion of one of the sides of the U-shaped web, the locking shank being resiliently displaceable with respect to the other of the sides of the U-shaped web, the locking shank extending laterally and downwardly away from the other of the sides of the U-shaped web at a lower portion of the locking shank to form a camming lip to guide the structural support into the open channel and past the fastener; and a locking flange extending laterally from a lower portion of the shank, seated beneath and in contact with the lower connecting edge of the structural support to retain the U-shaped web on the structural support.

2. A molding according to claim 1 wherein the camming lip has a lower rounded surface.

3. A molding according to claim 1 wherein there are multiple locking shanks disposed along the length of the U-shaped web.

4. A molding according to claim 1 wherein there is a single locking shank which extends along the length of the U-shaped web.

5. A molding according to claim 1 wherein the U-shaped web further comprises end walls which close the ends of the U-shaped channel.

6. A molding according to claim 1 and further comprising at least one wiper flange integral with and extending outwardly and upwardly from the one side of the U-shaped web and away from the end portion thereof.

7. A molding according to claim 6 wherein the at least one wiper flange has a layer of flocking on at least one side thereof.

8. A molding according to claim 1 and further comprising at least one seal flange extending from the U-shaped web into the open channel and abutting the planar surface of the structural support.

9. A molding according to claim 8 wherein the seal flange is coextruded with the molding.

10. A molding according to claim 8 wherein the seal flange is resilient.

11. A molding according to claim 1 and further comprising a substantially L-shaped web extending from a lower portion of the other side of the U-shaped web to define a second open channel for receiving and supporting a panel.

12. A molding according to claim 11 wherein the L-shaped web is resilient and a portion of the L-shaped web is adapted to resiliently abut the panel to at least partially retain the panel within the second open channel.

13. The combination of a structural support and a molding comprising:

the structural support having a planar surface terminating in a top edge and a lower connecting edge spaced below the top edge;

the molding being integrally molded in one piece entirely of a resilient thermoplastic or thermosetting material and comprising:

a resilient U-shaped web defining an open channel for receiving the top edge of the structural support; and a fastener retaining the molding on the structural support, the fastener comprising:

at least one locking shank, sufficiently rigid in its entirety so that the locking shank flexes as a unit, extending downwardly from an end portion of one of the sides of the U-shaped web, the locking shank being resiliently displaceable with respect to the other of the sides of the U-shaped web;

at least one resilient wiper flange integral with and extending outwardly and upwardly from the one side of the U-shaped web and away from the end portion thereof, the at least one resilient wiper flange being adapted to contact and resiliently wipe against a window adjacent the structural support on which the molding is mounted; and a locking flange extending laterally from a lower portion of the shank, the locking flange seating beneath and in contact with the lower connecting edge of the structural support to retain the U-shaped web on the structural support when the top edge of the structural support is received in the open channel.

14. A molding according to claim 13 wherein the at least one wiper flange has a layer of flocking on at least one side thereof.

15. The combination of a structural support and a molding of one-piece construction comprising:

the structural support having a planar surface terminating in a top edge and a lower connecting edge spaced below the top edge; and the molding comprising:

a U-shaped web defining an open channel receiving the top edge of the suctul support; and a fastener retaining the molding on the structural support, the fastener comprising:

multiple support shanks extending downwardly from an end portion of one of the sides of the U-shaped web, and a lateral retaining surface extending across an inside face of each of the shanks and seated beneath and in contact with the lower connecting edge of the structural support to retain the U-shaped web on the structural support with the top edge of the structural support received in the open channel of the U-shaped web.

* * * * *